(No Model.) 2 Sheets—Sheet 2.
O. S. BULLOCK.
MACHINE FOR MANUFACTURING CORDAGE.
No. 305,509. Patented Sept. 23, 1884.
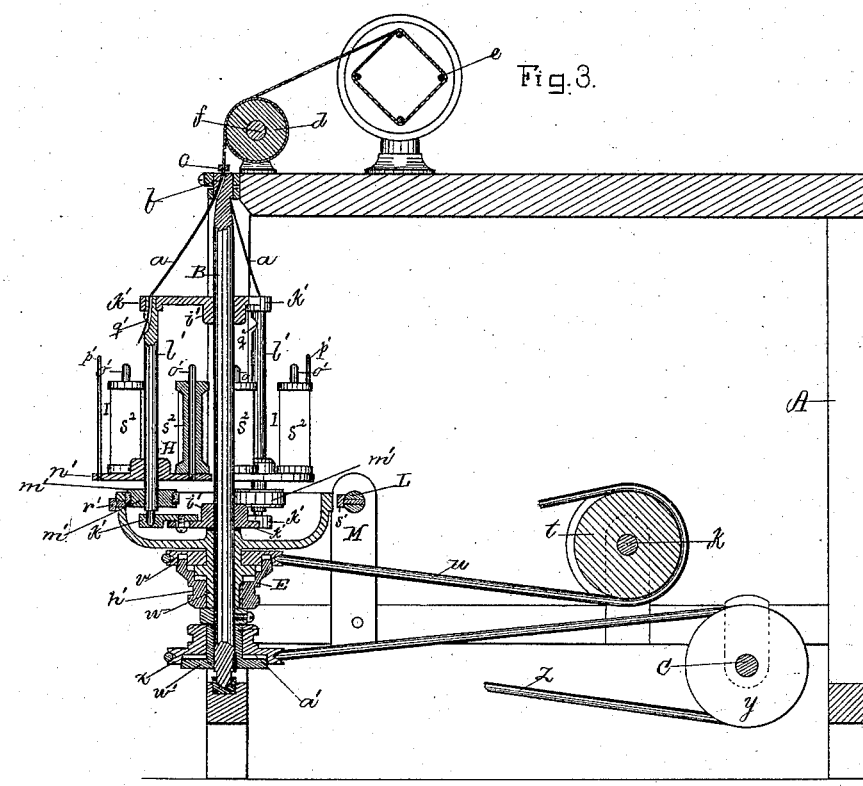
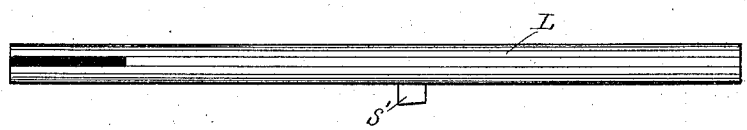
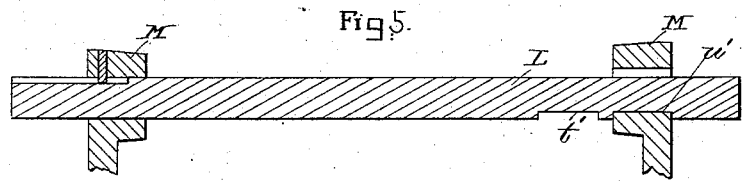
Witnesses
S. N. Piper
E. B. Pratt
Inventor.
Otis Sutton Bullock.
by R. H. Eddy att'y

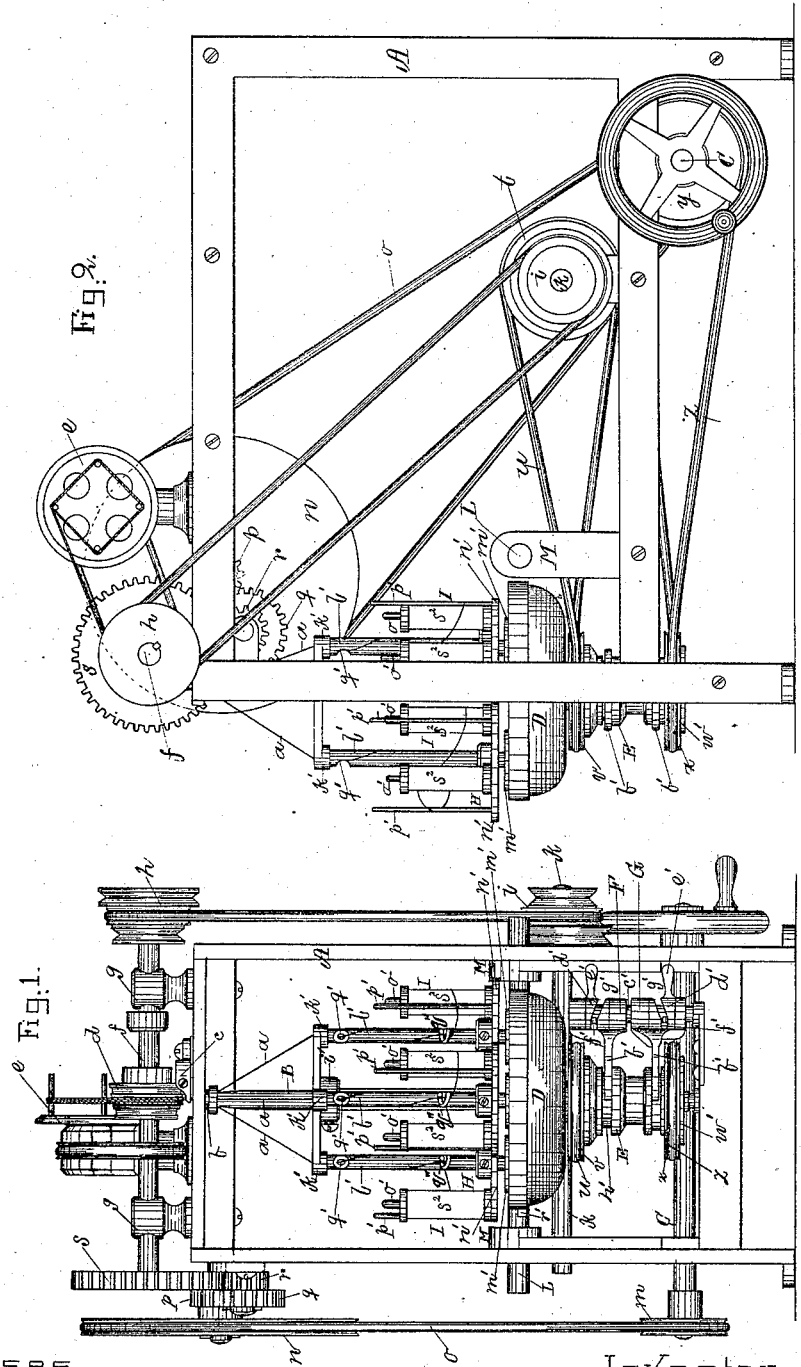

UNITED STATES PATENT OFFICE.

OTIS SUTTON BULLOCK, OF CAMBRIDGEPORT, MASSACHUSETTS.

MACHINE FOR MANUFACTURING CORDAGE.

SPECIFICATION forming part of Letters Patent No. 305,509, dated September 23, 1884.

Application filed December 11, 1883. (No model.)

*To all whom it may concern:*

Be it known that I, OTIS SUTTON BULLOCK, of Cambridgeport, in the county of Middlesex, of the Commonwealth of Massachusetts, have invented a new and useful Improvement in Machines for Manufacturing Cordage; and I do hereby declare the same to be described in the following specification and represented in the accompanying drawings, of which—

Figure 1 is a front end elevation, Fig. 2 a side view, and Fig. 3 a longitudinal section, of a machine embodying my invention, the nature of which is defined in the claim hereinafter presented. Fig. 4 is a top view, and Fig. 5 a vertical section, of the slide-rod L and its supporting-standards M M, hereinafter described.

The machine is to twist into strands a series of yarns, and to twist together such strands, in order to form of such yarns a twine or cord.

In the drawings, A denotes the frame for supporting the main operative parts of the machine. At one end of the frame is the main spindle B, for twisting together the several strands $a$, which extend through its head $b$, and thence through a compressor, $c$, and to and around a draft-wheel, $d$, and thence to a creel, $e$, as in various other analogous machines. The said draft-wheel $d$ is carried by a shaft, $f$, duly supported in boxes $g\ g$, and provided at one end with a cone-pulley, $h$, about which and another such pulley, $i$, fixed on another shaft, $k$, an endless band runs.

The driving-shaft of the machine is shown at C as having at one end a pulley, $m$, about which and a larger pulley, $n$, is an endless band, $o$. By means of a train of gears, $p\ q\ r\ s$, motion from the shaft of the pulley $n$ is communicated to the shaft $f$, on which the gear $s$ is fixed. The shaft $k$ carries a pulley, $t$, about which and another pulley, $v$, a crossed endless band, $u$, runs. The said pulley $v$ is arranged beneath a dished wheel, D, through which the sustaining tubular shaft $w$ of which and the said pulley the spindle B passes concentrically. The said tubular shaft $w$ carries a friction-clutch, E, movable vertically on such shaft, but applied so as to be revoluble with it. This friction-clutch is provided with suitable mechanism (shown at F) for so moving it to force it either into or out of engagement with the pulley $v$. When the pulley is revolving and engaged with the clutch, rotary motion will be imparted to the dished wheel D. Near its lower end there is fixed on the spindle B a conical wheel, $w'$, and directly over such a pulley, $x$, about which and another pulley, $y$, fixed on the driving-shaft, is a crossed endless band, $z$. From the above it will be seen that the pulley $x$ derives its rotary motion from the driving-shaft. The said pulley $x$ has adapted to it suitable mechanism (shown at G) for raising and lowering it, there being within the pulley a conical recess, $a'$, to engage the pulley by friction with the wheel $w'$, in order for the spindle B to be revolved by the pulley.

Each of the mechanisms F and G consists not only of a fork, $b'$, arranged to slide vertically on a post, $c'$, but of a spirally-slotted cylinder, $d'$, provided with a handle, $e'$, and adapted to turn on the post, there being a stud, $f'$, extended from the post into the slot $g'$ of the cylinder. Each fork $b'$ embraces its slotted cylinder in manner as represented. By taking hold of the handle $e'$ and turning its slotted cylinder the fork thereof, which in one case enters an annular groove, $h'$, in the hub of the friction-clutch, and in another in such a groove in the hub of the pulley $x$, will be moved vertically.

The spindle B has fixed on it two hubs, $i'$, from which three arms, $k'$, project radially at equal distances apart. From each of these arms an auxiliary spindle, $l'$, extends downward vertically, and has fixed on it at its lower end a friction-wheel, $m'$, having its periphery in contact with the inner periphery of the dished wheel D. Each of the auxiliary spindles at its ends is journaled in sustaining-arms, and there is fastened on the said spindle concentrically with it a carrier, H, for supporting a series of spools, I, such carrier consisting of a disk, $n'$, and a series of dead-spindles, $o'$ and $p'$, arranged as shown. Each of the spools $s^2$ is placed on one of the spindles, $o'$, concentrically therewith, and at its lower end the spool rests on the disk $n'$, or a suitable washer or friction device placed thereon. The spools turn loosely on their sustaining-spindles, the yarns from such spools being led around the dead-spindles $p'$ to and through an eye, $q''$, projecting from the intermediate auxiliary spindle. Thence, after being wound one or more times about the said auxiliary spindle, they pass into and up through the end thereof at $g'$, through the head of the main spindle.

The dished wheel D has an ear, $r'$, projecting from its outer periphery. In rear of the wheel is a rod, L, supported by and so as to be capable of being slid longitudinally in two stationary standards, M M. From this rod L there projects toward the wheel D an ear, $s'$, the rod having in it two notches, $t'$ and $u'$, for one of the standards M to enter to determine either of two positions of the rod. The rod L, its ear, and the ear of the dished wheel are to effect stoppage of the latter or to hold it from being revolved when it may be desirable to so stop it.

From the above it will be seen that with the dished wheel stationary the friction-wheels of the auxiliary spindle will effect with such dished wheel revolutions of spool-carriers while they are put in orbital rotation by the main spindle, such being to twist together the three yarns proceeding from the spools of each spool-carrier.

In carrying out my invention I have combined with the dished wheel mechanism, as described, for revolving it in a direction opposite to that in which the main spindle turns, whereby I increase the speed of revolution of each of the auxiliary spindles during its orbital traverse. I am thus enabled to increase the twist put into each strand in its passage from its auxiliary spindle to the main spindle. Furthermore, besides such mechanism for so revolving the dished wheel, I have a mechanism for putting into or out of engagement with the dished wheel the mechanism for revolving it, and I also have a mechanism for effectually stopping the dished wheel from being revolved by the friction of the wheels of the spool-carriers, this last mechanism being the ears $r'$ $s'$ and notched slide-rod L and its sustaining-standards M, arranged as explained. Consequently,

I claim—

The combination, with the rotary dished wheel, the main and auxiliary spindles, the bobbin-carriers and their friction-wheels, the mechanism for revolving the dished wheel, as described, and the mechanism for putting into and out of engagement with the said dished wheel the said mechanism for revolving it, of the dished-wheel-stopping mechanism, substantially as described, consisting of the ears $r'$ $s'$, notched slide-rod L, and its sustaining-standards M, all being adapted and to operate essentially as represented.

OTIS SUTTON BULLOCK.

Witnesses:
R. H. EDDY,
E. B. PRATT.